United States Patent
Rana et al.

(10) Patent No.: US 10,868,688 B2
(45) Date of Patent: Dec. 15, 2020

(54) METHOD FOR SETTING FUNCTIONAL PARAMETERS OF A CONTROLLER OF A REFRIGERATION APPARATUS

(71) Applicant: CAREL INDUSTRIES S.P.A., Brugine (IT)

(72) Inventors: Andrea Rana, Brugine (IT); Ivan Favaro, Brugine (IT)

(73) Assignee: CAREL INDUSTRIES S.P.A., Brugine (IT)

( * ) Notice: Subject to any disclaimer, the term of this patent is extended or adjusted under 35 U.S.C. 154(b) by 0 days.

(21) Appl. No.: 16/349,377

(22) PCT Filed: Sep. 17, 2018

(86) PCT No.: PCT/IB2018/057108
§ 371 (c)(1),
(2) Date: May 13, 2019

(87) PCT Pub. No.: WO2019/053670
PCT Pub. Date: Mar. 21, 2019

(65) Prior Publication Data
US 2019/0386845 A1   Dec. 19, 2019

(30) Foreign Application Priority Data
Sep. 18, 2017   (IT) ........................ 102017000104053

(51) Int. Cl.
*G06F 15/16*   (2006.01)
*H04L 12/28*   (2006.01)
(Continued)

(52) U.S. Cl.
CPC ........ *H04L 12/2803* (2013.01); *G06F 3/0482* (2013.01); *H04L 67/025* (2013.01);
(Continued)

(58) Field of Classification Search
CPC . H04L 12/2803; H04L 67/025; H04L 67/125; H04L 67/34; H04L 2012/285; G06F 3/0482
See application file for complete search history.

(56) References Cited

U.S. PATENT DOCUMENTS 6,675,591 B2 * 1/2004 Singh ....................... A23G 9/00
                                                              62/129
6,892,546 B2 * 5/2005 Singh ....................... A23G 9/00
                                                              62/127
(Continued)

OTHER PUBLICATIONS

International Search Report and Written Opinion for Corresponding International Application No. PCT/IB2018/057108 (11 Pages) ( Dec. 17, 2018).

*Primary Examiner* — Alicia Baturay
(74) *Attorney, Agent, or Firm* — Lucas & Mercanti, LLP

(57) ABSTRACT

A method for setting functional parameters of a refrigeration apparatus controller is disclosed. A controller is prepared to operate a refrigeration apparatus having a unique identifier. The controller has a set of settable functional parameters having a plurality of subsets, each associated with an identifier. A setting device is provided to set each functional parameter of the set. A step of preparing a plurality of secondary applications is also included wherein each secondary application has a specific identifier and interacts with the primary application to limit the functional parameters which can be set by the primary application to the functional parameters belonging a specific subset. An assignment step for recording an identifier in the controller; a detection step during which the setting device is connected to the controller to receive the identifier; and an adaptation step for downloading the secondary application associated with the identifier received from an archive are also provided.

9 Claims, 1 Drawing Sheet

(51) Int. Cl.
*G06F 3/0482* (2013.01)
*H04L 29/08* (2006.01)

(52) U.S. Cl.
CPC ............ *H04L 67/125* (2013.01); *H04L 67/34* (2013.01); *H04L 2012/285* (2013.01)

(56) References Cited

U.S. PATENT DOCUMENTS

| | | | | |
|---|---|---|---|---|
| 7,024,870 | B2* | 4/2006 | Singh | A23G 9/00 |
| | | | | 62/126 |
| 7,082,380 | B2* | 7/2006 | Wiebe | F25B 49/005 |
| | | | | 702/182 |
| 7,644,591 | B2* | 1/2010 | Singh | G05B 15/02 |
| | | | | 62/127 |
| 8,065,886 | B2* | 11/2011 | Singh | G06Q 10/087 |
| | | | | 62/127 |
| 8,757,507 | B2* | 6/2014 | Fadell | G05B 15/02 |
| | | | | 236/94 |
| 9,134,715 | B2* | 9/2015 | Geadelmann | G05D 23/1905 |
| 10,006,654 | B2* | 6/2018 | Shaull | G05B 15/02 |
| 10,055,699 | B2* | 8/2018 | Brown | G06Q 10/06 |
| 2004/0210419 | A1* | 10/2004 | Wiebe | F25B 49/005 |
| | | | | 702/182 |
| 2014/0216071 | A1 | 8/2014 | Broadbent | |
| 2014/0244001 | A1 | 8/2014 | Glickfield et al. | |
| 2015/0304157 | A1 | 10/2015 | Kim et al. | |
| 2019/0219296 | A1* | 7/2019 | Wallace | G05B 19/048 |
| 2019/0331357 | A1* | 10/2019 | Rogerson | F25D 17/005 |

* cited by examiner

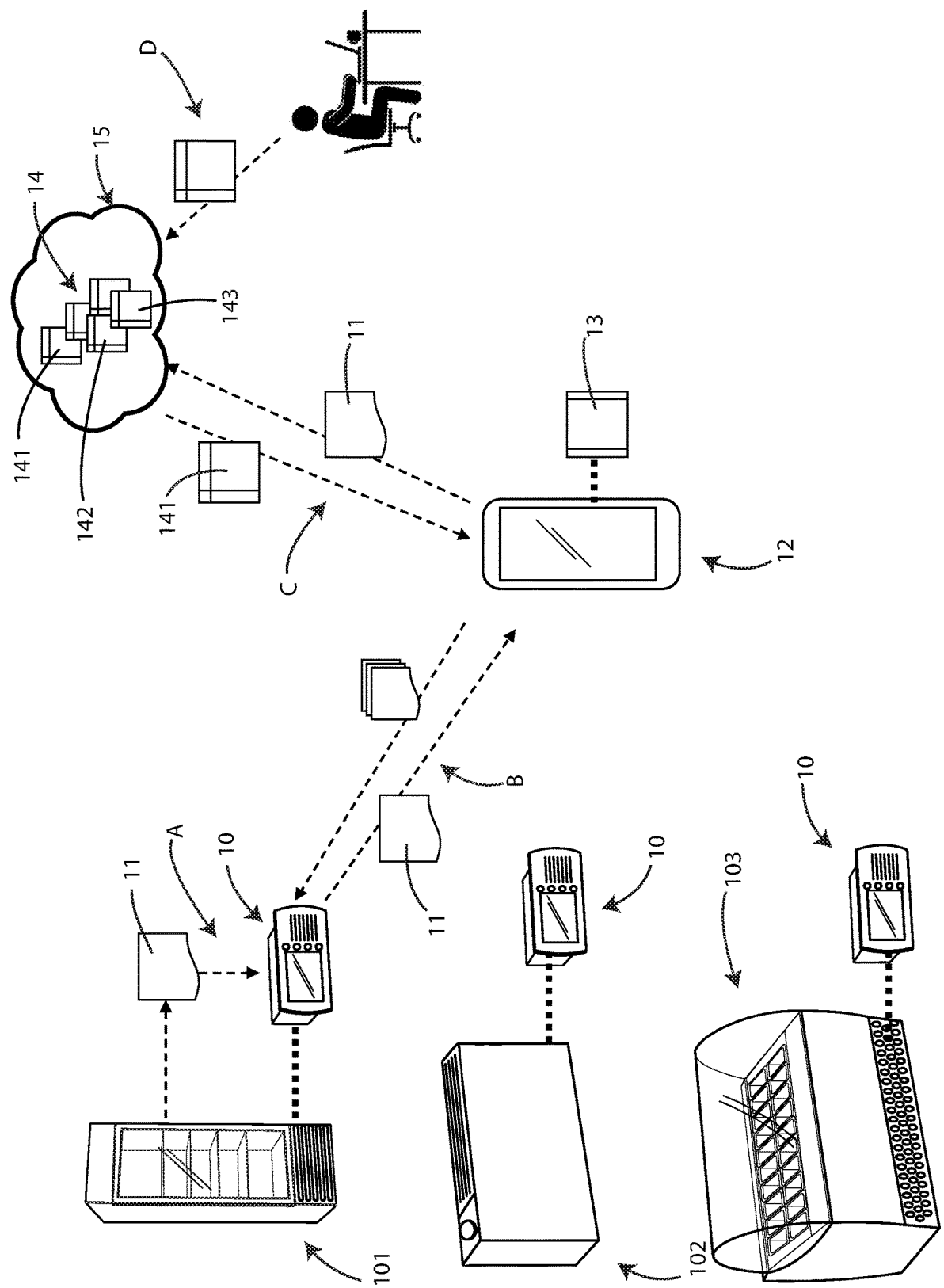

METHOD FOR SETTING FUNCTIONAL PARAMETERS OF A CONTROLLER OF A REFRIGERATION APPARATUS

CROSS-REFERENCE TO RELATED APPLICATIONS

This application is a 371 of PCT/IB2018/057,108, filed Sep. 17, 2018 which claims the benefit of Italian Patent Application No. 10,2017/000,104,053, filed Sep. 18, 2017.

FIELD OF THE INVENTION

The present invention relates to a method for setting functional parameters of a controller of a refrigeration apparatus.

BACKGROUND OF THE INVENTION

In particular, the present invention relates to a method for setting controllers of refrigeration apparatus which may be easily adapted to a wide range of refrigeration apparatus which have different applications.

Nowadays, in the sector of refrigeration apparatus, universal controllers are known and widely available.

These controllers have a simple and essential structure, are provided with a minimal interface and incorporate an electronic device designed to be programmed so as to control and operate different types of refrigeration apparatus such as refrigerators for automatic beverage or snack dispensers, refrigerators for cooling cabinets or cooling tanks, heat exchangers for cooling the environment and the like.

In particular, each type of such apparatus will have a specific set of typical functional parameters.

For example, for an automatic beverage or snack dispenser, the main functional parameters will be the nominal daytime and night-time refrigeration temperatures, the programmed operation of a forced-convection fan if present, the cycles for daytime activation and night-time deactivation of the lighting, and the defrosting cycle start conditions.

Differently, a cooling cabinet for containing bottles may have as functional parameters for example the timing of the internal lights during the daytime and night-time, setting of the delay for activation of a standby state with respect to the last opening of the cabinet, the duration of the standby state, or the brightness of the internal lights during the standby state.

These controllers are provided with means for connecting them to a user interface device which is able to interact electronically with the controllers in order to define the settings and receive the associated data. Nowadays the interface device is generally a smartphone provided with a dedicated application for interfacing with the controller generally by means of radiofrequency-emission remote interconnection protocols.

For this purpose the manufacturers of refrigeration apparatus nowadays provide suitable applications designed to interact with the controllers.

These applications are specially designed to adjust the specific operating parameters of the refrigeration apparatus and therefore each application cannot be used to perform the settings of a controller of refrigeration apparatus of types other than that for which it is designed.

On the other hand, providing an operator with the entire set of functional parameters which can be set would require a high degree of expertise on the part of the operator in order to select and correctly set the appropriate parameters for the application which is to be adjusted in each case.

The problem underlying the present invention is that of simplifying the setting and maintenance of refrigeration apparatus provided with settable interactive controllers.

SUMMARY OF THE INVENTION

The main task of the present invention consists in developing a method for setting functional parameters of a controller of a refrigeration apparatus, which provides a solution to this problem, overcoming the drawbacks mentioned with regard to the prior art described above.

In connection with this task an object of the present invention is to propose a method for setting functional parameters of a controller of a refrigeration apparatus, which does not require a high degree of expertise on the part of the operators responsible for setting or performing the maintenance of refrigeration apparatus.

Another object of the present invention consists in developing a method for setting functional parameters of a controller of a refrigeration apparatus, which is flexible and allows, with minimum adaptation, the setting of various types of refrigeration apparatus belonging to the category commonly identified by the abbreviation HVAC (Heating, Ventilation, Air Conditioning and Refrigeration).

Detailed characteristic features of the method for setting functional parameters of a controller of a refrigeration apparatus according to the invention are described in the corresponding dependent claims.

BRIEF DESCRIPTION OF THE DRAWINGS

Further characteristic features and advantages of the invention will emerge more clearly from the description of a preferred, but not exclusive, embodiment of the method for setting functional parameters of a controller of a refrigeration apparatus according to the invention, shown by way of a non-limiting example in the attached set of drawings, in which FIG. 1 shows a diagram of a method for setting functional parameters of a controller of a refrigeration apparatus, according to the present invention.

DETAILED DESCRIPTION OF THE INVENTION

With particular reference to the said FIGURE, three examples of refrigeration apparatus 101, 102, 103 are shown therein, each of said apparatus being equipped with a controller 10 which is known per se and is advantageously of the universal type, namely is configured to drive, depending on the particular requirements, different models of refrigeration apparatus, and can be set for this purpose.

The example illustrated in the attached FIGURES, which is provided by way of a non-limiting example, shows a first refrigeration apparatus 101 consisting of a cooling cabinet for bottled or canned beverages, a second refrigeration apparatus 102 consisting of a heat exchanger for air-conditioning plants, and a third refrigeration apparatus 103 consisting of a refrigerated counter for scoop-dispensed ice-creams.

These types of refrigeration apparatus are similar to each other as regards the refrigeration power which are they designed to output and the possible accessory devices, such as internal ventilators and/or internal lighting devices.

In the present text, in general, where the expression "refrigeration apparatus" is used it is understood as meaning not a single specific refrigeration apparatus but a type of refrigeration apparatus, for example so-called "bottle coolers" or cabinets for cooling bottled or canned drinks or duct-type refrigerated counters or air-conditioning heat exchangers.

Thus the identifier 11 is understood as being a unique identifier for the type of refrigeration apparatus and remains the same for a whole category of refrigeration apparatus and does not change for apparatus which are different but which nevertheless belong to this category.

For example, two different bottle coolers, which both consist of the same model, but have been produced on different days or in different batches, will have the same identifier 11 even though, being different products, they will clearly have different serial numbers each identifying the corresponding product.

A method of setting functional parameters of a controller 10 of a refrigeration apparatus 101, 102, 103, according to the present invention, generally has a particular feature in that it comprises:

preparing a controller 10 configured to operate a refrigeration apparatus 101, 102, 103 selected from among a plurality of refrigeration apparatus belonging to a predefined group; a unique identifier 11 is associated with each of the refrigeration apparatus; the controller 10 has a set of settable functional parameters, said set comprising a plurality of subsets each of which is associated with one of the identifiers so as to be specially designed for operation of the refrigeration apparatus 101, 102, 103 identified by the identifier 11; the controller 10 is designed to record an identifier 11 relating to the refrigeration apparatus 101, 102, 103 in which it is integrated;

preparing a controller 12 provided with a primary application 13 configured to set each of the functional parameters of the aforementioned set and provided with a user interface, for example a touch screen interface, by means of which the primary application 13 may be operated;

preparing a plurality of secondary applications, denoted overall by 14, and an archive 15 in which these applications are stored; each of the secondary applications 14 is associated with a specific identifier 11 of the refrigeration apparatus and is configured to interact with the primary application 13 so as to limit the functional parameters which can be set, by means of said application, to the functional applications belonging to a specific subset of the said subsets, where this specific subset comprises (and preferably consists of) the functional parameters for operating the refrigeration apparatus which in the example of the attached FIGURE—is the first refrigeration apparatus 101 which is identified by the aforementioned specific identifier 11.

In other words:

each refrigeration apparatus is identified by means of an identifier and its functional parameters belong to a subset of the set of functional parameters which can be set by the primary application; this subset is then associated with the same identifier of the refrigeration apparatus;

numerous secondary applications are prepared, each being specially designed to limit the functional parameters which can be set by the primary application to a subset corresponding to a specific refrigeration apparatus, the identifier of which is therefore associated with the corresponding secondary application.

In this way the following are associated with the same identifier 11:

a specific refrigeration apparatus 101, the subset of functional parameters intended to set the operation of this refrigeration apparatus 101 and the secondary application, which in the attached FIGURE is indicated by way of example by the reference number 141 and which is designed to limit to this subset the functional parameters which can be set by this primary application 13 such that, when this secondary application interacts with the primary application 13, only the functional parameters belonging to the said subset can be set by means of the combination thereof.

The setting device 12 comprises remote connection means which are designed to be connected to the archive 15 so as to download from it one of the secondary applications 14 and/or to the controller 10 in order to set the functional parameters.

In accordance with the present invention the method comprises moreover:

an assignment step A, during which the identifier 11 of the refrigeration apparatus 101, 102, 103 in which the controller 10 is integrated is recorded in the controller 10;

a detection step B, during which the setting device 12 is connected to the controller 10 in order to receive the identifier 11 therefrom;

an adaptation step C, comprising unloading from the archive 15 the secondary application 141 associated with the identifier 11 received.

A possible example of sets of functional parameters which can be managed by the main application 13 and which are subdivided into functional groups is described below.

Parameters associated with operation of the temperature probes:
measurement stability;
selection of displayed probe/input;
selection of ° C. or ° F.;
disabling of decimal point.

Parameters which may be associated with the temperature adjustment:
adjustment temperature;
minimum SET value permitted for the user;
maximum SET value permitted for the user;
operating mode;
automatic variation of night-time set point;
adjustment differential;

Parameters which may be associated with operation of the compressor:
delay for start of compressor and delay for start of the fan after activation of the compressor;
minimum time between successive compressor switching-on operations;
minimum compressor switching-off time;
minimum compressor operation time;
compressor safety;
duration of the continuous cycle;

Parameters which may be associated with the defrosting function:
type of defrosting;
interval between two defrosting operations;
maximum duration or real duration of defrosting;
defrosting start delay on switch-on;

Parameters relating to alarm conditions:
alarm and fan differential;

low-temperature alarm threshold/deviation;
high-temperature alarm threshold/deviation;
time delay for activation of low-temperature and high-temperature alarm;
temperature threshold for condenser high-temperature alarm;
condenser high-temperature alarm differential;
high-temperature alarm delay.

Parameters which may be associated with operation of the fans:
fan management;
temperature threshold for fan switch-off;
fans stopped when compressor is stopped;
state of the fans during defrosting.

Preferably the aforementioned predefined group of refrigeration apparatus comprises refrigeration apparatus chosen from among those of the family commonly identified by the abbreviation HVAC/R (Heating, Ventilation, Air Conditioning and Refrigeration).

Advantageously, the secondary applications 14 are configured to limit the setting of the values of the functional parameters of the aforementioned subsets to specific value ranges.

For example, for a functional parameter relating to the operating speed of a convection fan of the first refrigeration apparatus 101, the secondary application 141 associated with the corresponding identifier may envisage limiting the setting of this functional parameter within a certain range of possible speeds of the fan.

The secondary applications 14 are preferably designed to drive the user interface in order to show in graphic form:
both the refrigeration apparatus 101 which the specific secondary application 141 is designed to set,
and the functional parameters of the corresponding subset.

Advantageously, the primary application 13 and the secondary applications 14 are implemented so as to be executed by a smartphone.

The remote connection means preferably comprise radio wave transceivers able to operate using protocols commercially known as NFC, Bluetooth and Wi-Fi.

Preferably, the identifier 11 comprises a first identification element able to identify the manufacturer and/or the model of the refrigeration apparatus 101, 102, 103 identified and a second identification element able to identify the controller model 10 integrated in the refrigeration apparatus 101, 102, 103.

Each secondary application preferably comprises an instruction manual, in electronic format, of the refrigeration apparatus 101, 102, 103 identified by the identifier associated with the said secondary application so that, during the adaptation step C, downloading of the secondary application and the instruction manual is performed simultaneously.

Advantageously, the method according to the present invention also comprises a diagnostics step during which the controller 10 transmits to the setting device 12 data relating to the particular operating conditions of the refrigeration apparatus 101, 102, 103 in which the controller 10 is integrated.

The method according to the present invention preferably also comprises a preliminary step D which involves the preparation of the secondary applications 14 and the storage thereof in the archive 15.

During the preliminary step D each secondary application 14 is associated with an identifier 11.

In operative terms the implementation of a method according to the present invention envisages therefore carrying out a preliminary step D during which a secondary application is provided for each refrigeration apparatus of the aforementioned predefined group of refrigeration apparatus. In the example shown in the attached FIGURES, which envisages that the predefined group comprises three refrigeration apparatus 101, 102, 103, three corresponding secondary applications 141, 142 and 143 will therefore be prepared.

In this case, the controller 10 of the first refrigeration apparatus 101 will be pre-set so that the identifier 11 of the first refrigeration apparatus 101, for example relating to a bottle cooler, is stored in it.

The first identifier will therefore be associated with the first secondary application 141 and corresponding identifiers will be associated with the second secondary application 142 and the third secondary application 143.

The user will have a setting device 12 which will be pre-set with the primary application 13.

When the user wishes to perform the setting of the first refrigeration apparatus 101, her/she performs the detection step B connecting the setting device 12 to the controller 10 for example by means of Bluetooth or NFC.

In this way the setting device 13 acquires the identifier 11 from the controller 10 and performs the adaptation step C.

During the adaptation step C the identifier 11 detected is transmitted to the archive 15 and consequently the first secondary application 141, which is that associated with the same identifier 11, is transmitted from the archive 15 to the setting device 12.

The first secondary application 141 is combined temporarily with the primary application 13 so that the latter provides the user, via the user interface, only with the functional parameters relating to the first refrigeration apparatus 101, which can therefore be set within the ranges predefined by the first secondary application 141.

In this way the setting of the refrigeration apparatus, or rather of its controller, is greatly simplified since the user is guided by the secondary application which is specially designed for the refrigeration apparatus to be set, thus avoiding the need for the user to be in possession of any specific expertise.

Clearly, if the user is required to set a different refrigeration apparatus, the aforementioned steps are repeated such that the secondary application corresponding to this different (type of) refrigeration apparatus is unloaded from the setting device and is temporarily integrated in the primary application so as to replace the secondary application previously downloaded.

The present method, in a possible mode of implementation, may envisage that the controller 10 comprises:
a control device designed to operate the refrigeration apparatus 101, 102 or 103 and
a router device connected to the control device and designed to act as a gateway for transcodification of the protocols of the control device and the protocols of the setting device.

The router device preferably is a device which is physically independent of the control device even though preferably it is combined with the latter so that they form, together, integrated components of the controller 10. In particular, the router device advantageously will be a commercial component which is per se universal, namely not originally designed for application to the control device of the controller 10.

The invention thus devised may be subject to numerous modifications and variations, all of which fall within the scope of protection of the accompanying claims.

Moreover all the details may be replaced by other technically equivalent elements.

Where the constructional characteristics and the methods mentioned in the following claims are followed by reference numbers or symbols, these reference numbers or symbols have been assigned with the sole purpose of facilitating understanding of the said claims and consequently they do not limit in any way the interpretation of each element which is identified, purely by way of example, by said reference numbers or symbols.

The invention claimed is:

1. Method for setting functional parameters of a controller of a refrigeration apparatus, comprising:
    preparing a controller configured to operate a refrigeration apparatus selected from among a plurality of refrigeration apparatuses belonging to a predefined group; a unique identifier being associated with each of said refrigeration apparatus; said controller having a set of settable functional parameters, said set comprising a plurality of subsets of functional parameters, each of said subsets being associated with one of said unique identifier so as to be specifically designed for operation of the refrigeration apparatus identified by said identifier; said controller being able to record one of said unique identifier;
    preparing a setting device provided with a primary application configured to set each of the functional parameters of said set and provided with a user interface via which said primary application may be operated;
    preparing a plurality of secondary applications and an archive in which these applications are stored; each of said secondary applications being associated with a specific identifier from among the unique identifiers of said refrigeration apparatus and being configured to interact with said primary application so as to limit the functional parameters which can be set by means of said primary application to the functional parameters belonging to a specific subset of said subsets, said specific subset comprising the functional parameters for operating the refrigeration apparatus identified by said specific identifier;
    said setting device comprising remote connection means designed to be connected to said archive, in order to download from it one of said secondary applications, and/or to said controller in order to set said functional parameters;
    said method further comprising:
        an assignment step (A), during which an identifier which corresponds to the identifier of the refrigeration apparatus in which said controller is integrated is recorded in said controller;
        a detection step (B) during which said setting device is connected to said controller in order to receive said identifier therefrom; and
        an adaptation step (C), comprising downloading from said archive the secondary application associated with said identifier received.

2. Method according to claim 1, wherein said predefined group of refrigeration apparatus comprises refrigeration apparatuses chosen from among those of the HVAC/R category.

3. Method according to claim 1, wherein said secondary applications are configured to limit the setting of functional parameters values of the aforementioned subsets to specific value ranges.

4. Method according to claim 1, wherein said secondary applications are designed to drive said user interface so as to show in graphic form the refrigeration apparatus and the functional parameters of the corresponding subset.

5. Method according to claim 1, wherein said primary application and said secondary applications are configured to be executed by a smartphone or by a personal computer.

6. Method according to claim 1, wherein said remote connection means comprise radio wave transceivers able to operate using NFC, Bluetooth and Wi-Fi protocols.

7. Method according to claim 1, wherein said identifier comprises a first identification element able to identify the manufacturer and/or the model of the refrigeration apparatus identified and a second identification element able to identify the model of controller integrated in said refrigeration apparatus.

8. Method according to claim 1, wherein each secondary application of said secondary applications comprises an instruction manual, in electronic format, of the refrigeration apparatus identified by the identifier associated with said secondary application.

9. Method according to claim 1, which comprises a diagnostics step during which said controller transmits to said setting device data relating to the operating conditions of the refrigeration apparatus in which said controller is integrated.

* * * * *